United States Patent [19]

Anada et al.

[11] Patent Number: 5,267,149
[45] Date of Patent: Nov. 30, 1993

[54] SYSTEM AND METHOD FOR REGISTERING PASSWORDS

[75] Inventors: Noriaki Anada; Tadao Abe, both of Tokyo, Japan

[73] Assignee: Oki Electric Industry Co. Ltd., Tokyo, Japan

[21] Appl. No.: 664,523

[22] Filed: Mar. 5, 1991

Related U.S. Application Data

[63] Continuation of Ser. No. 390,391, Aug. 7, 1989, abandoned, which is a continuation of Ser. No. 86,576, Aug. 18, 1987, abandoned.

[30] Foreign Application Priority Data

Aug. 20, 1986 [JP] Japan .............................. 61-192934
Jan. 14, 1987 [JP] Japan .............................. 62-4900
Jan. 20, 1987 [JP] Japan .............................. 62-9052

[51] Int. Cl.$^5$ ...................... G06F 15/21; G06F 15/30
[52] U.S. Cl. ................................ 364/408; 235/379; 235/380
[58] Field of Search .............. 364/408, 401; 235/379, 235/380; 340/825.34

[56] References Cited

U.S. PATENT DOCUMENTS

| | | | |
|---|---|---|---|
| Re. 30,773 | 10/1981 | Glaser et al. | 235/379 |
| 3,876,864 | 4/1975 | Clark et al. | 235/379 |
| 4,023,012 | 5/1977 | Ano et al. | 235/329 |
| 4,123,747 | 10/1978 | Lancto et al. | 235/380 |
| 4,423,313 | 12/1983 | Tanigaki | 235/379 |
| 4,523,087 | 6/1985 | Benton | 235/380 |
| 4,528,442 | 7/1985 | Endo | 235/379 |
| 4,532,416 | 7/1985 | Berstein | 235/379 |
| 4,617,457 | 10/1986 | Granzow et al. | 235/379 |
| 4,629,872 | 12/1986 | Hällberg | 235/379 |
| 4,692,600 | 9/1984 | Takahashi | 235/379 |
| 4,694,147 | 9/1987 | Amemiya et al. | 235/379 |
| 4,758,718 | 7/1988 | Fujisaki et al. | 235/487 |

FOREIGN PATENT DOCUMENTS 0229170 11/1985 Japan .............................. 235/329

Primary Examiner—Donald E. McElheny, Jr.
Assistant Examiner—David Huntley
Attorney, Agent, or Firm—Spencer, Frank & Schneider

[57] ABSTRACT

A system and method for registering a password includes a data center that processes and stores transaction data, and a teller window transaction device communicating with the data center. The teller window transaction device has a first input device such as a keyboard used by a teller for inputting transaction data, a first display unit used by the teller for displaying the transaction data, a second input device such as an input panel used by the customer, and a second display unit used by the customer for displaying the transaction data. When a new customer's card is issued, the first input device is used by the teller for inputting information such as the customer's name and address, and this information is shown on the second display unit as well as the first display unit so that the customer can confirm that it has been accurately entered. Thereafter the customer is prompted to use the second input device to enter a secret password, which has not been disclosed to the teller. Preferably the customer enters the password several times, to impress it on his memory and to permit one entry of the password to be checked electronically against another entry of the password. Other embodiments permit a customer who has already been issued a card to change the password without revealing the new password to the teller or others. This updating of the password may be conducted regardless of whether the customer still possesses the card. The teller display and the customer display are arranged in substantially face-to-face relationship. Passwords are entered by the customer at the second input device without revealing the passwords to others.

36 Claims, 12 Drawing Sheets

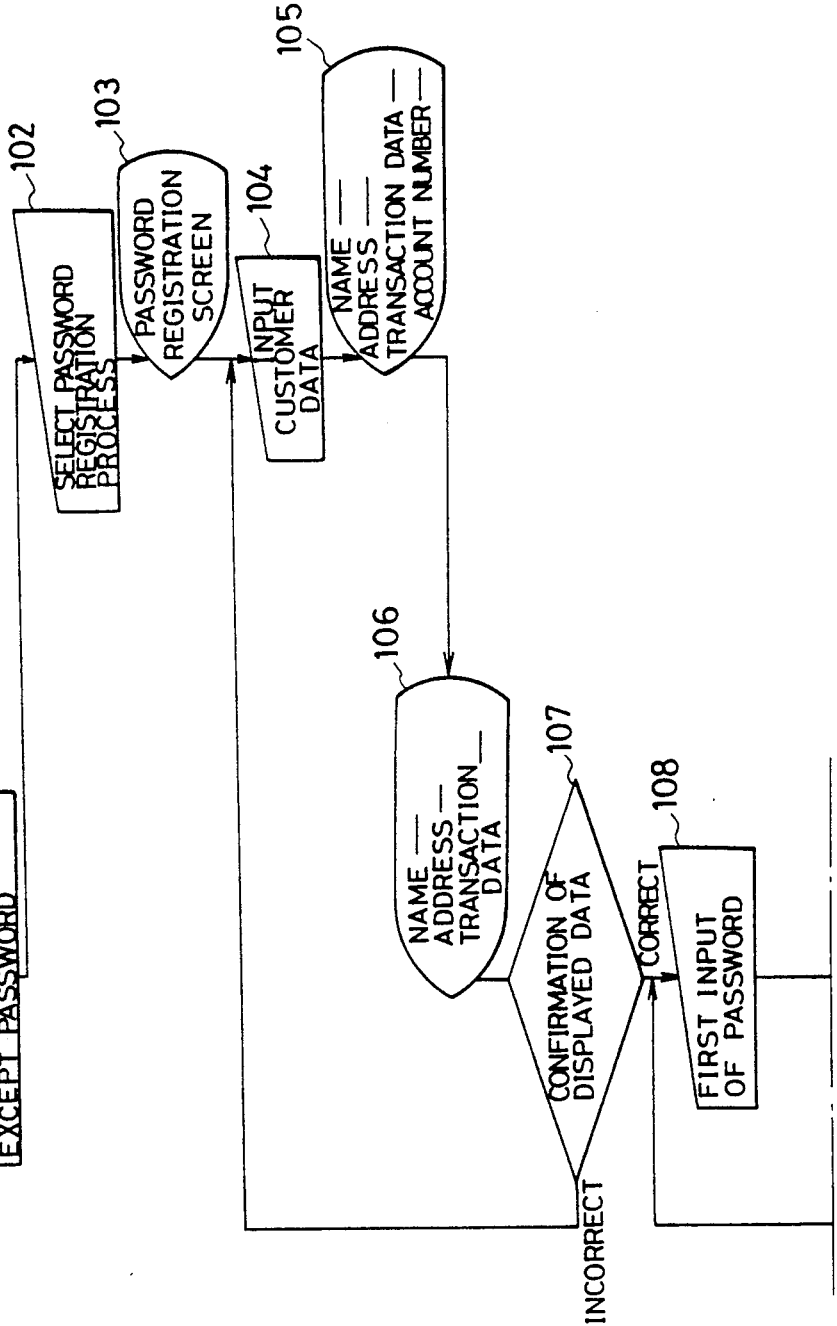

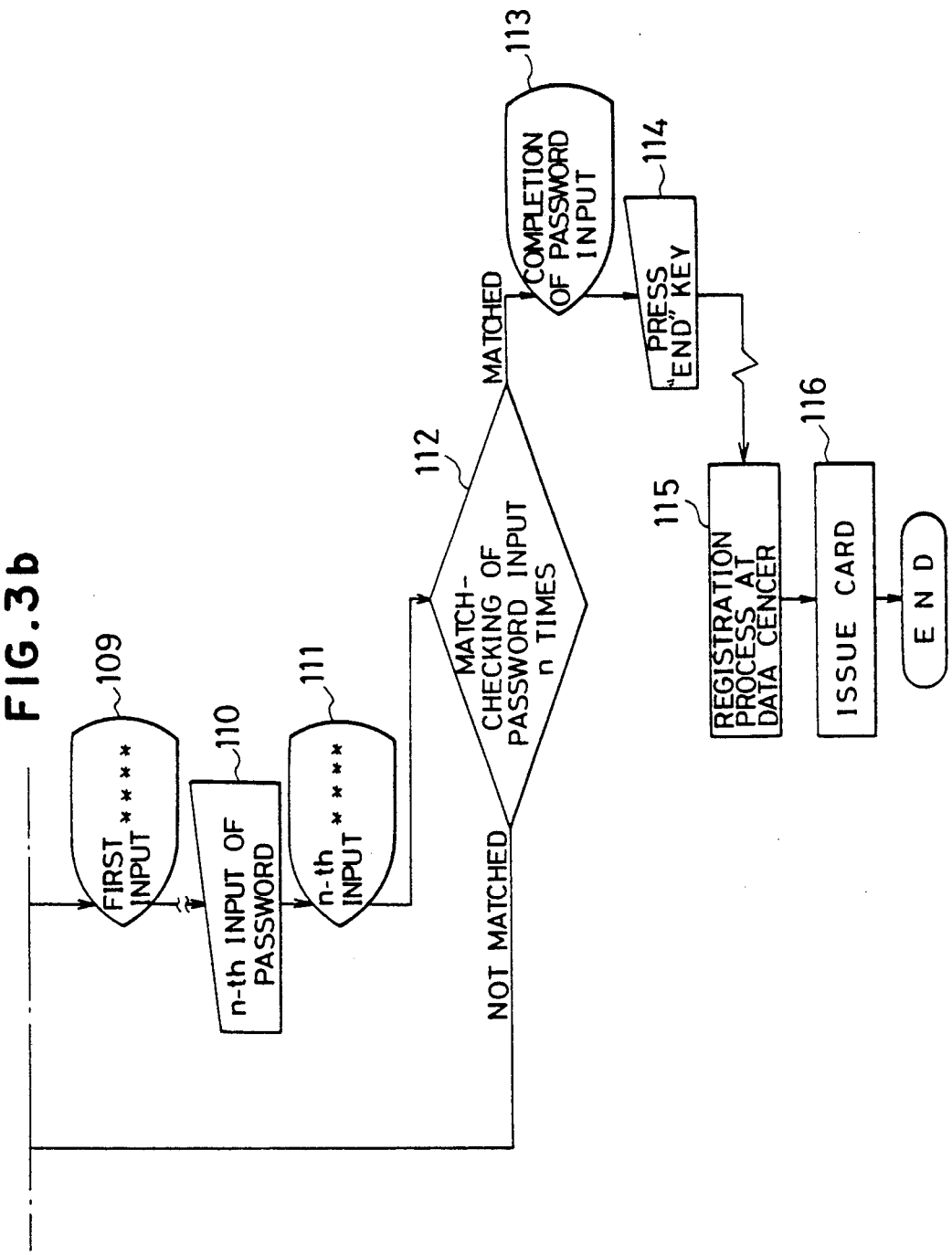

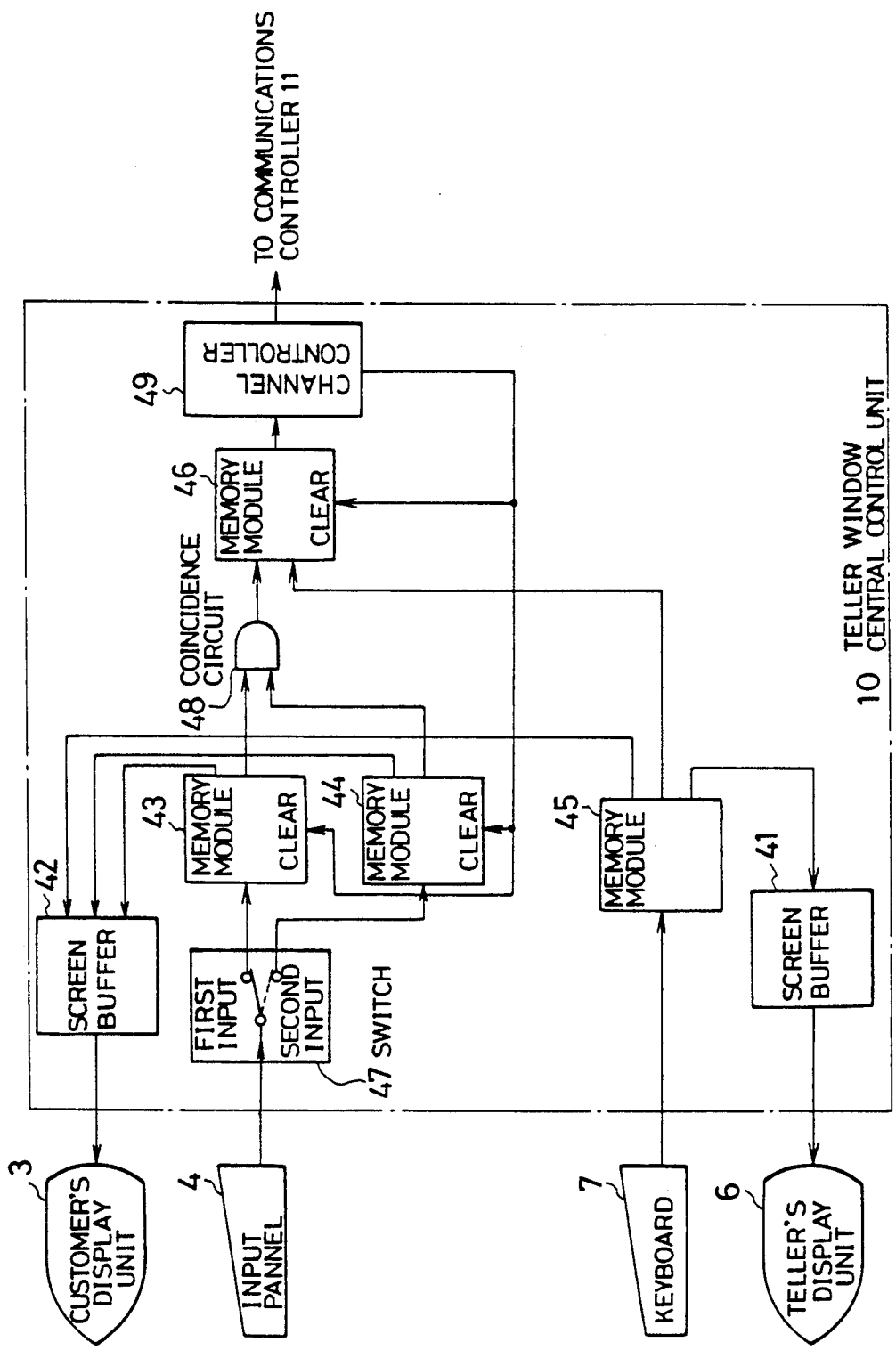

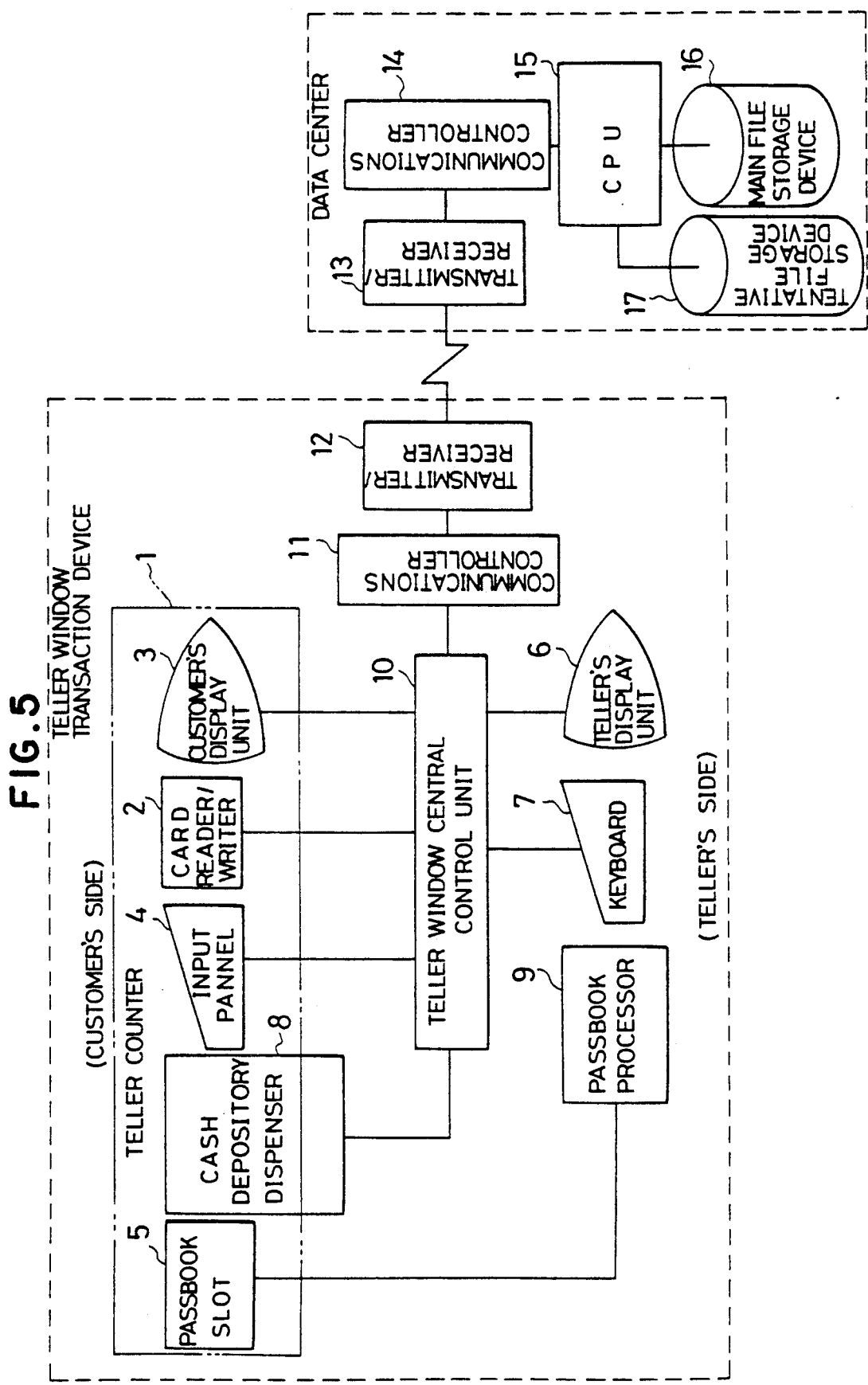

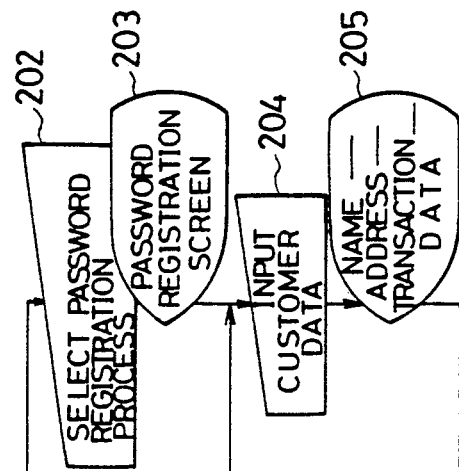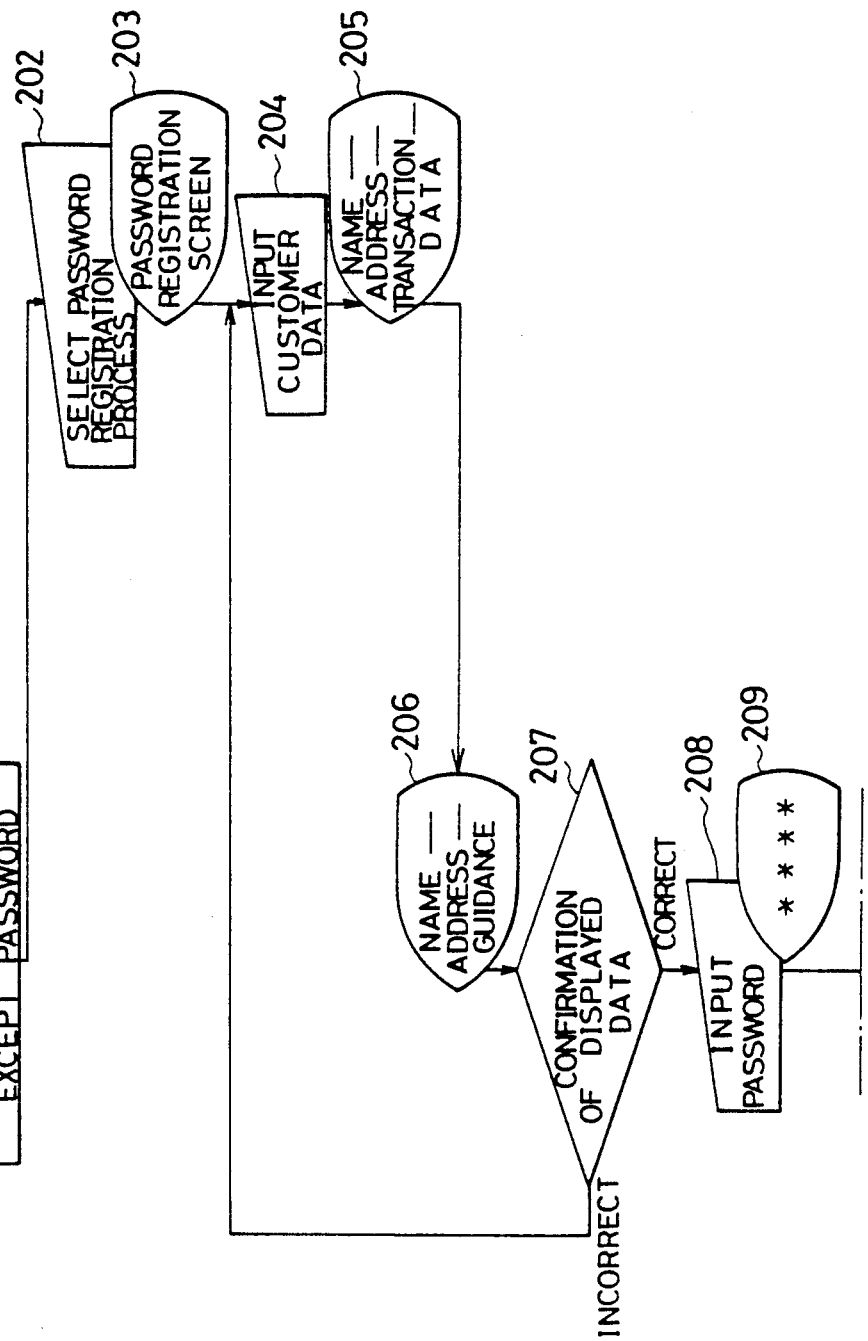

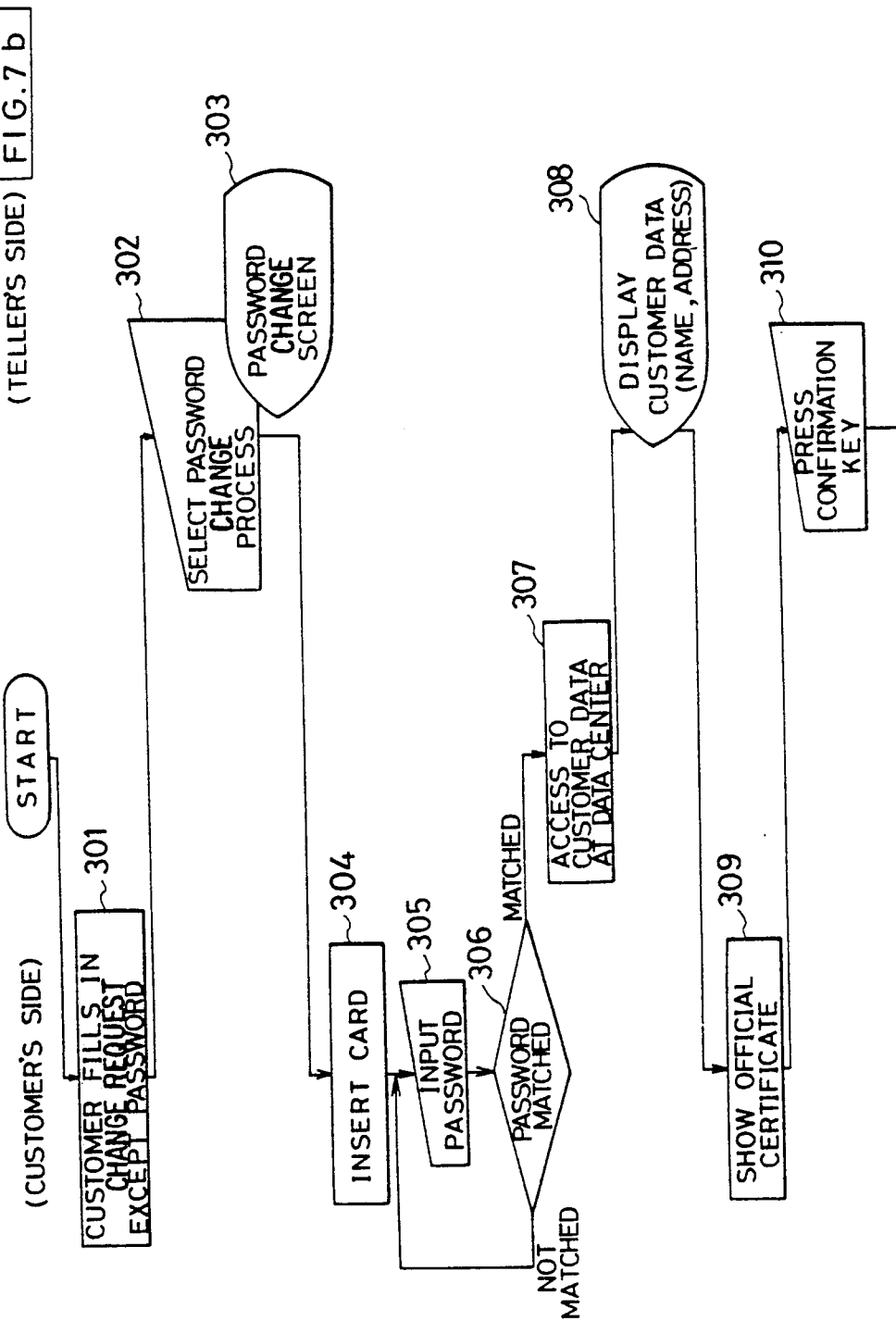

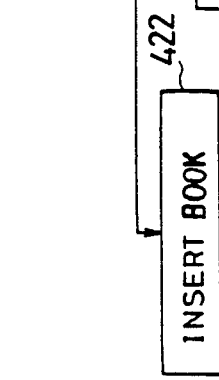

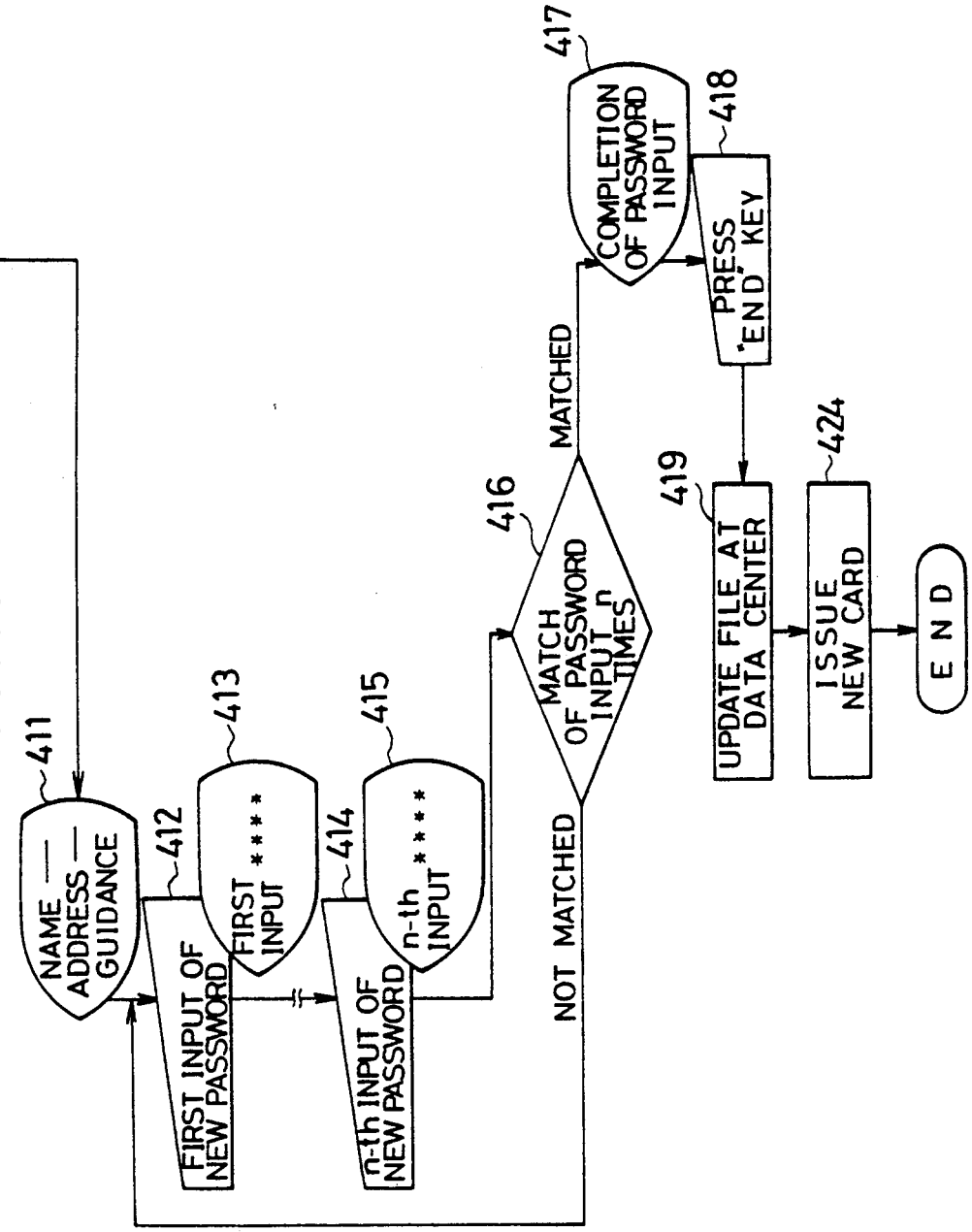

SYSTEM AND METHOD FOR REGISTERING PASSWORDS

This application is a continuation of application Ser. No. 07/390,391, filed Aug. 7th, 1989, which in turn was a continuation of application Ser. No. 07/086,576, filed Aug. 18th, 1987 both now abandoned.

BACKGROUND OF THE INVENTION

The present invention relates to a system for registering passwords and, more specifically, a system for registering at data centers the passwords used for customer confirmation in such matters as deposits or withdrawals of funds between financial institutions and applications for bank accounts or cards.

At present, many services at financial institutions and other places are making use of cards. When such cards are used, a password must be used as a means of customer confirmation. Therefore, when cards are issued, the password for each card must already have been registered. Password registration is performed in the following sequence of steps.

(1) The customer enters the required information on the appropriate form and at the same time enters the password (number) to be registered.
(2) The completed form is checked by an employee of the financial institution.
(3) The completed form is sent to the registration processing department of the financial institution.
(4) The completed form is checked a second time at the registration processing department.
(5) The password to be registered is input along with the other transaction data by a terminal
(6) The entered transaction data are registered on a file storage device at the data center.

After the password is registered using the above steps, it is written from the data center's file storage device to a magnetic strip on a magnetic card or to the memory module of an IC card, and the card is then issued to the customer. In some cases, the customer is also sent a document upon which the password has been printed.

However, this conventional system, in which the password to be registered is written on a form which is then processed by several financial institution employees and other related persons, presents a problem in that the secret password can easily be divulged to unrelated persons.

SUMMARY OF THE INVENTION

An object of the present invention is to solve this problem.

Another object of the invention is to provide a password registration system that eliminates both the risk of divulging passwords to unrelated persons and the occurrence of input errors and that ensures improved security.

To accomplish the above objects, the present invention is characterized by comprising a data center that processes and stores the transaction data and a teller window transaction device having a first input means used by the teller for inputting the transaction data; a first display means used by the teller for displaying the transaction data; a second input means used by the customer; and a second display means used by the customer.

The teller uses the first input means to instruct the customer to register his or her password. When this is done, the screen for registering the password is displayed on the first display means while a prompt for inputting the password is displayed on the second display means. With reference to this prompt, the customer uses the second input means, which is provided for on the customer side of the teller window, to directly input his or her password. Next, the entered password is sent via the communication controller and the telecommunication channels to the data center and is stored or registered on a file storage device in the data center. This completes the password registration process.

Therefore, the present invention is able to solve the problem described above and can provide a password registration system that eliminates the risk of divulging passwords to unrelated persons and that can improve security.

BRIEF DESCRIPTION OF THE DRAWINGS

FIGS. 3a and 3b are a flowchart showing the password registration process performed by the first embodiment.

FIG. 4 is a functional block diagram showing the configuration of the teller window central control unit 10 of FIG. 1.

FIG. 5 is a functional block diagram of a second embodiment of the invention.

FIGS. 6a and 6b are a flowchart showing the password registration process performed by the second embodiment.

FIGS. 7a, 7b, 8a and 8b are flowcharts showing the password change process in a third embodiment of the invention.

DESCRIPTION OF THE PREFERRED EMBODIMENTS

An embodiment of the present invention is described below with reference to the appended drawings.

Figure 1:
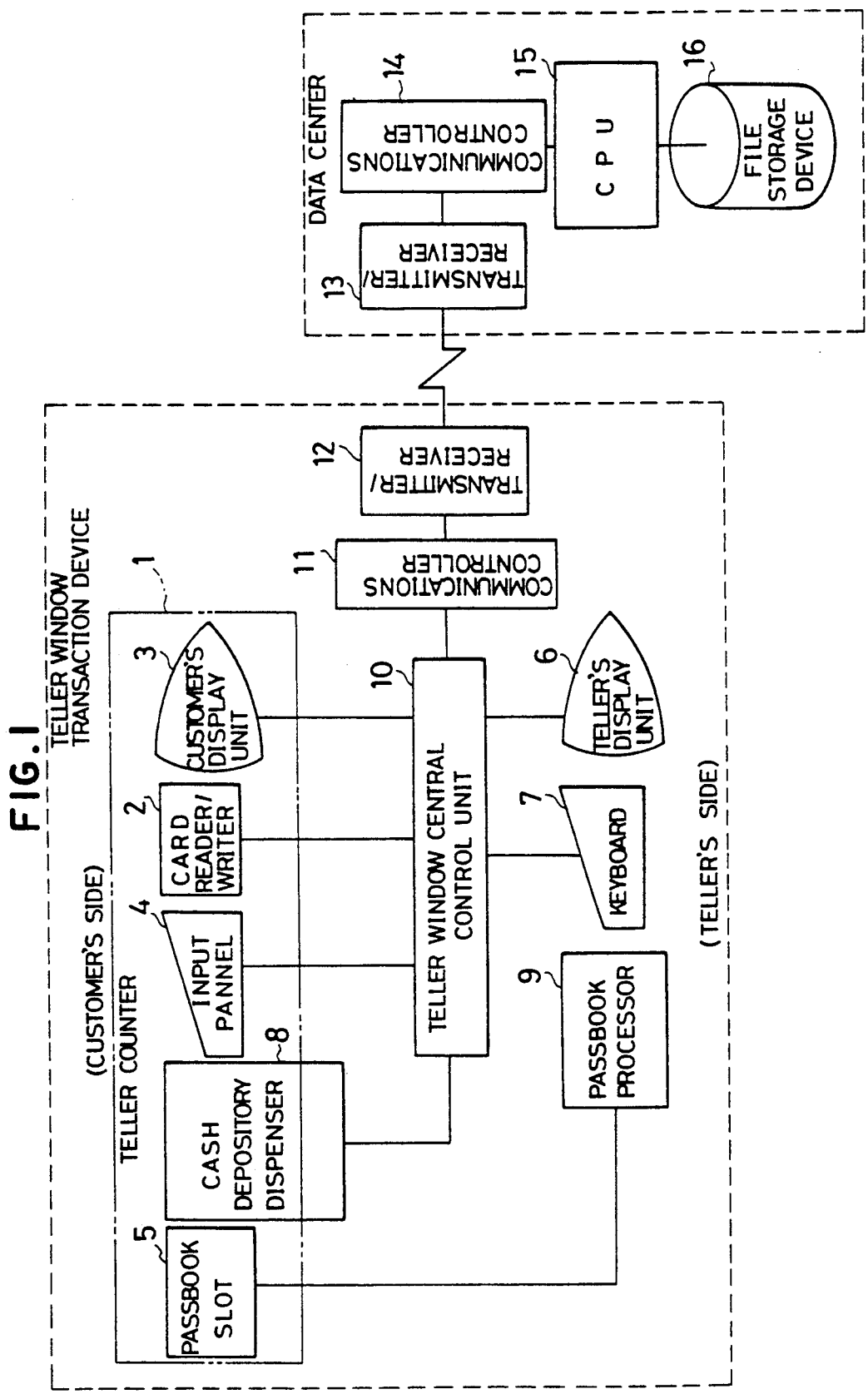
FIG. 1 is a functional block diagram of a first embodiment of the present invention.
Figure 2:
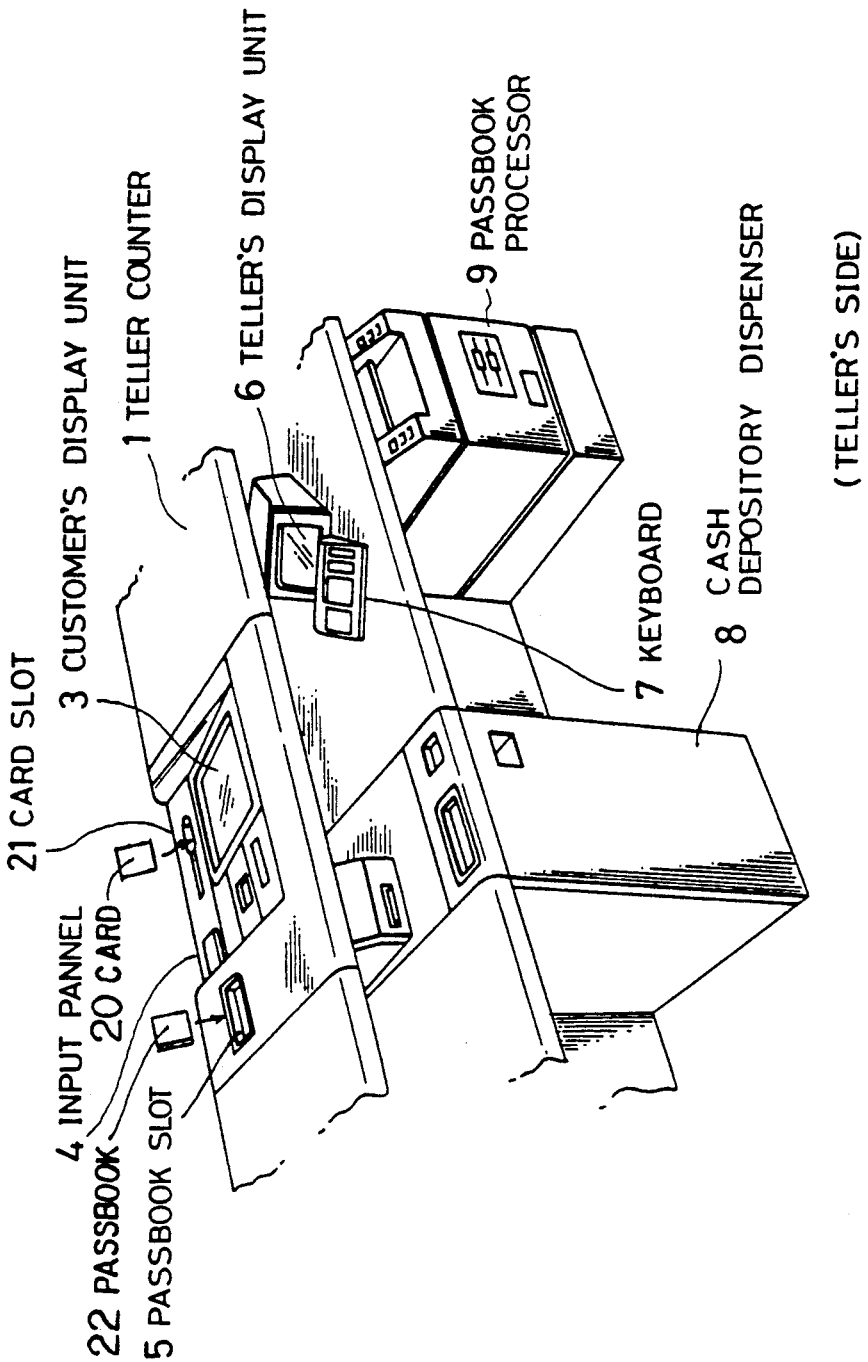
FIG. 2 is a perspective view of the teller window transaction system used in the first embodiment.

FIG. 1 is a functional block diagram of an embodiment of the present invention and FIG. 2 is a perspective view of the teller window transaction device used in this embodiment. In FIG. 1, reference numeral 1 designates a teller counter; 2 is a card reader/writer that reads the transaction data written on a card 20 that has been inserted in the card slot 21 described below; 3 is a customer's display unit that displays for the customer the prompts for data input, the transaction data, and the data that have been input via the keyboard 7 as described above: 4 is an input panel by which the customer inputs his or her password according to the prompts and that consists of either a pin pad or touch panel; 5 is a passbook slot in which an inserted passbook 22 is written upon and then ejected; 6 is a teller's display unit that is installed on the teller's side of the counter and that displays the data that have been input via the input panel 4 or the keyboard 7 described below; 7 is a keyboard for key input of data by financial institution employees; 8 is a cash depository dispenser for receiving and dispensing money; 9 is a passbook processor for entering information on passbooks that have been inserted into the processor's passbook slot; 10 is a teller window central control unit that processes signals received from the various system components and that controls the operation of these various system components; 11 and 14 are communications controllers; 12 and 13 are transmitter/receivers; 15 is a CPU (Central Processing Unit); and 16 is a file storage device which contains the customer identification data and password. In FIG. 2, the same components as in FIG. 1 are shown with the same reference numbers. As can be seen in FIG. 2, the customer's side of the teller counter 1 is equipped with a card reader/writer 2 and its card slot 21 as well as a customer's display unit 3, input panel 4, and passbook slot 5. The teller's side of the teller counter 1 is equipped with a teller's display unit 6, a keyboard 7, and other components. In addition, the teller's side also has designated locations for the cash depository dispenser 8, passbook processor 9, and other devices required for teller window transactions.

As can be seen in FIG. 1, each of the system components is connected to the teller window central control unit 10, and the teller window transaction device includes this central control unit 10 as well as the communications controller 11 and the transmitter/receiver 12. The transmitter/receiver 12 is also connected via telecommunication channels to another transmitter/receiver 13 at the data center, and this transmitter/receiver 13 is linked to a CPU 15 via a communications controller 14 and to a file storage device 16 via the CPU 15.

Below, the password registration process by the password registration system of the embodiment illustrated in FIGS. 1 and 2 will be explained using the flowchart shown in FIG. 3.

A customer wishing to register a password either enters all of the required information except for the password on the appropriate form and hands the form to the teller or orally reports the required information so the teller can fill in the application (Step 101). The teller then selects via the keyboard 7 the password registration processing mode or option (Step 102) and, following the password registration processing screen's instructions (Step 103) shown in the teller's display unit 6 he inputs the customer's address, name, and other customer identification data (or simply "customer data" for the sake of brevity) via the keyboard 7 (Step 104). The customer data entered by the teller are also shown on the customer's display 3 (Steps 105 & 106). The customer checks these displayed data (Step 107) and asks the teller to correct any errors that are found or, if there are no errors, the customer inputs his or her desired password n times (Step 108 & 110). As the customer inputs his or her password, each digit is indicated by a mark (Steps 109 & 111). For example, when the first digit of the number is input, a single asterisk (*) appears, and when the second digit is input two asterisks (**) appear. The particular number given for each digit is shown either on the customer's display unit 3 nor on the teller's display unit 6. After the password has been input n times, the n sets of passwords are compared by a logic circuit in the teller window central control unit 10 (Step 112), and if they do not all match the process returns to Step 108 for re-input of the password. If they all match, completion of the customer's input procedure is indicated on the teller's display unit 6 (Step 113) and the teller then presses the End key on the keyboard 7 (Step 114) to initiate transmission of the customer data and password via the communications controllers 11 and 14 and the transmitter/receivers 12 and 13 to the data center's CPU 15. CPU 15 then registers the customer data and password on the file storage device 16 (Step 115). Next, the data center notifies the teller window transaction device that the password has been registered, and this completes the process of password registration at the teller window. However, in cases where a card or other such item must be issued, the relevant department at the data center subsequently uses an issuing device (not shown in the figures) that is connected to the CPU 15 to produce, without revealing the password to anyone, the card or other such item which bears this password, which is then sent to the customer (Step 116).

FIG. 4 is a functional block diagram showing the configuration of the teller window central control unit 10 in FIG. 1, in which the password must be input two times. In FIG. 4 the same components as in FIG. 1 are shown with the same reference numbers. The following components are also included: screen buffers 41 and 42, memory modules 43, 44, 45, and 46, switch 47, coincidence circuit 48, and channel controller 49. The switch 47 switches the input setting between first the input and the second input during input of the password from the input panel 4. In other words, the first password input is temporarily stored in memory module 43 and the second password input is temporarily stored in memory module 44. The coincidence circuit 48 compares the two passwords—the first input temporarily stored in memory module 43 and the second input in memory module 44—and if they match, this matched password is sent for storage in memory module 46.

Below, the operation of the teller window central control unit 10 will be explained with reference to FIG. 4.

The customer data entered by the teller via the keyboard 7 are stored in memory module 45 and then pass through screen buffer 41 to be displayed on the teller's display unit 6 while also passing through screen buffer 42 to be displayed on the customer's display unit 3. The password first input by the customer via the input panel 4 is routed via the switch 47 for storage in memory module 43, and the digit indicators for this number pass via screen buffer 42 to the customer's display unit 3 to show the number of digits entered. Next, when the password is input a second time, this number is routed via the switch 47 for storage in memory module 44, and the digits entered are displayed in the same manner as for the first input. When the second input is completed, the coincidence circuit 48 compares the data in memory modules 43 and 44, and if these data match, they are sent along with the customer data from memory module 45 for storage in memory module 46. The contents of memory module 46 are then sent by the channel controller 49 to the communications controller 11. After correct transmission of the data from the channel controller 49 to the data center has been confirmed, memory modules 43, 44, and 46 are cleared of their contents and no trace of the password remains in the teller window transaction system.

In the embodiment described above, the process in which the customer is required to input his or her password several times (n times) and in which these entered numbers are checked by matching is done to help the customer correctly memorize the number. Naturally, it is also possible to have the customer input the number only once.

As described above, the above embodiment enables the customer to directly input his or her password via the input panel 4, and this number is then sent via telecommunication channels for registration in the file storage device 16 at the data center. This is intended to eliminate the risk of easily divulging the password to unrelated parties and thus to improve security. Furthermore, by having the customer enter his or her password several times and by having these entered numbers checked by matching before sending the desired number to the data center, incorrect data entry can also be eliminated.

FIG. 1 illustrate a card reader/writer 2, but a card reader which does not have the function of writing can be used instead.

FIG. 5 shows another embodiment of the invention. In this embodiment, a tentative file storage device 17 is provided in addition to the main file storage device 16, which is similar to the file storage device 16 of the embodiment of FIGS. 1 to 4. Other components having identical or similar functions to those in FIG. 1 are shown with identical reference numbers.

Figure 6B:
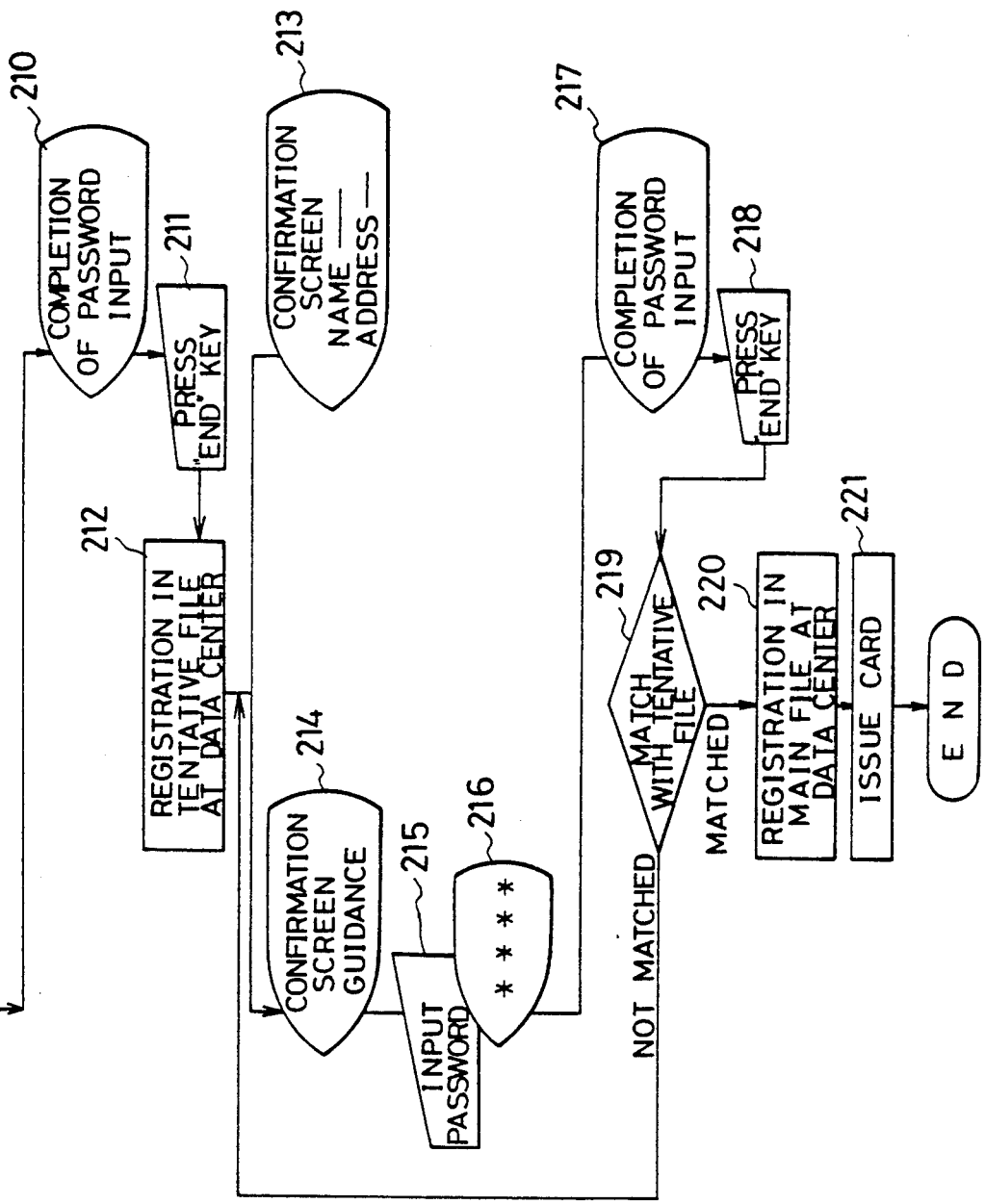

The operation of the embodiment of FIG. 5 will now be described with reference to FIG. 6.

A customer wishing to register a password either enters all of the required information except for the password on the appropriate form and hands the form to the teller or orally reports the required information so the teller can fill in the application (Step 201). The teller then selects via the keyboard 7 the password registration processing mode or option (Step 202) and, following the password registration processing screen's instructions (Step 203) shown in the teller's display unit 6, he inputs the customer's address, name, and other customer data via the keyboard 7 (Step 204). The customer data entered by the teller are also shown on the customer's display 3 (Steps 205 & 206). The customer checks these displayed data (Step 107) and asks the teller to correct any errors that are found or, if there are no errors, the customer inputs his or her desired password (Step 208). As the customer inputs his or her password, each digit is indicated by a mark (Step 209). For example, when the first digit of the number is input, a single asterisk (*) appears, and when the second digit is input two asterisks (**) appear. The particular number given for each digit is not shown on the customer's display unit 3 nor on the teller's display unit 6. After the password has been input, completion of the customer's input procedure is indicated on the teller's display unit 6 (Step 210) and the teller then presses the End key on the keyboard 7 (Step 211) to initiate transmission of the customer data and password via the communications controllers 11 and 14 and the transmitter/receivers 12 and 13 to the data center's CPU 15. CPU 15 then registers the customer data and password on the tentative file storage device 17 (Step 212). Next, the data center notifies the teller window transaction system that the password has been registered in the tentative file storage device. This notification is sent via the communications controllers 11 and 14, and the transmitter/receivers 12 and 13. Upon receipt of this notification, the teller's display unit 6 and the customer's display unit 3 display a confirmation screen (Step 213 & 214). In accordance with the display on the customer's display 3, the customer inputs the password again (Step 215). During the input, the customer's display unit 3 and the teller's display unit 6 make display similar to that in the step 209 (Step 216). Upon completion of the input, the teller's display unit 6 displays that the input by the customer is completed (Step 217). The teller then presses the End key on the keyboard 7 (Step 118). When this End key is pressed, the customer data and the password are then sent via the communications controllers 11 and 14, and the transmitter/receivers 12 and 13 to the CPU 15 at the data center. The CPU 15 checks whether the password that has been transmitted to it and the password that is stored in the tentative file storage device 17 match each other (Step 219). If they do not match, the CPU 15 again sends the confirmation screen to the teller's display 6 and the customer's display unit 3. When the matching is confirmed, the customer data stored in the tentative file storage device 17 and the password are registered in the main file storage device 16 (Step 220). The data that have been stored on the tentative file storage device 17 are erased. When the data center notifies that the registration is completed, the process of password registration at the teller window is completed. However, in cases where a card or other such item must be issued, the relevant department at the data center subsequently uses an issuing device (not shown in the figures) that is connected to the CPU 15 to produce, without revealing the password to anyone, the card or other such item which bears this password, which is then sent to the customer (Step 221).

In this embodiment, the password input a first time is stored in a tentative file storage device 17 in the data center and the password input a second time is compared with the password stored in the tentative file storage device. If they match the password is stored in the main file storage device 16. By use of such a procedure, erroneous input of the password is avoided. Moreover, it helps the customer to memorize the password correctly.

Figure 7B:
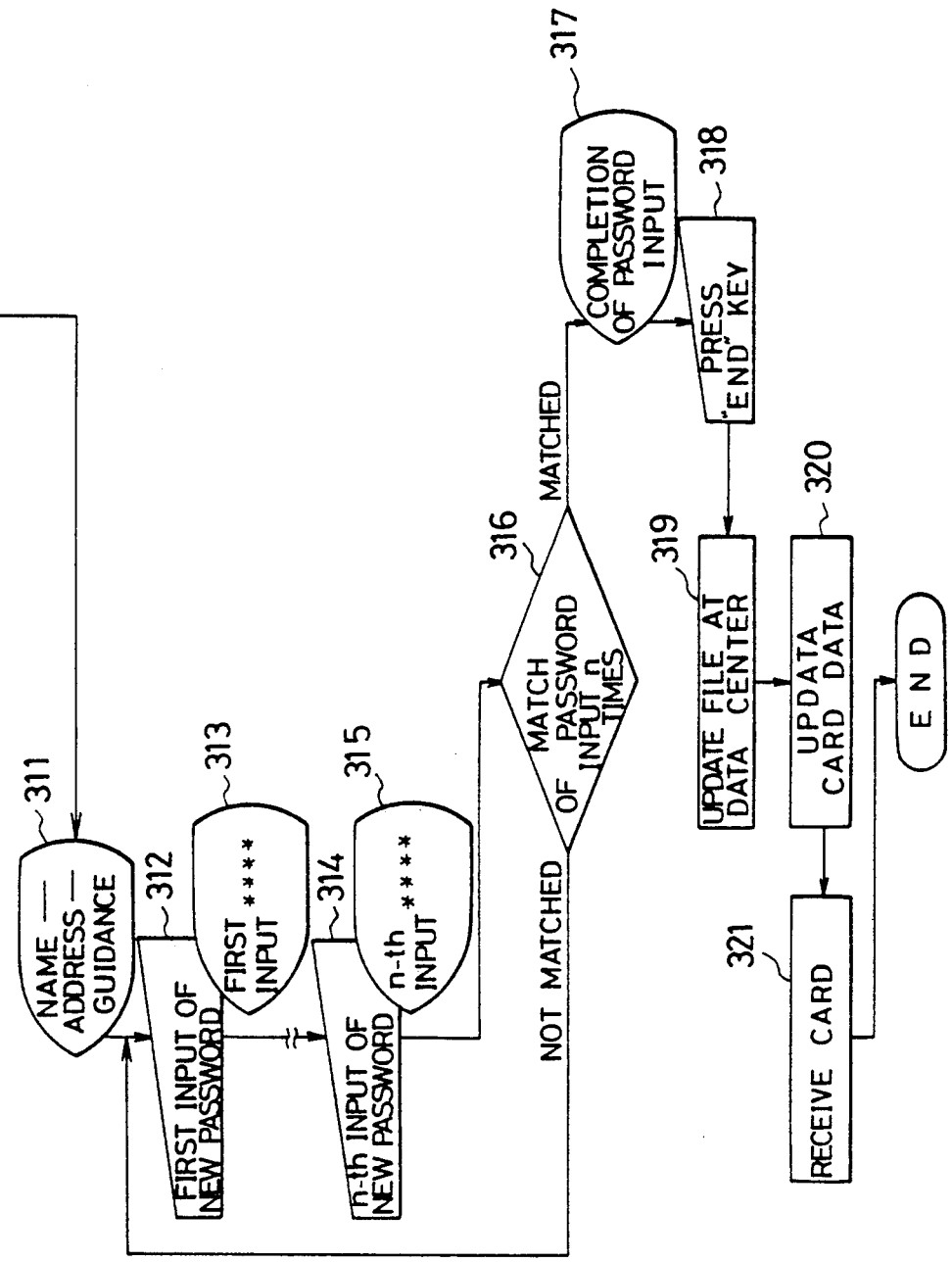

A further embodiment of the invention will now be described with reference to FIGS. 7 and 8. The system of this embodiment is generally identical to that shown in FIG. 1. In this embodiment, the registration of the password is done in substitution of the old (present) password. Such change of the password is required when, for instance, the password has been made known to others.

In this embodiment, the card reader/writer 2 is used for changing the password on the card.

The teller window central control unit 10 has the functions of controlling the card reader/writer 2, of controlling the display by the customer's display unit unit 3 and the teller's display unit 6, of controlling input by the input panel 4, and the keyboard 7, and of controlling the channel, as well as other functions. The input control functions include means for comparing the password that has been input and the password that is registered to confirm the identity of the person, and matching means for confirming the matching in the password between a plurality of repeated inputs. The repeated input procedure is adopted to avoid erroneous input of the password and to help the customer to memorize the password correctly. The comparing means can be provided in the teller window transaction system as in the following description, but it can alternatively be provided in the data center.

The operation of this embodiment will be described with reference to FIGS. 7 and 8. FIG. 7 shows a case in which the customer has a card with him. FIG. 8 shows a case in which the customer does not have the card, for instance having lost it. The same process steps are identified by the same reference marks except for the first digit.

A customer wishing to change a password either enters a request on the appropriate form without revealing the password and hands the form to the teller or orally reports the request to the teller (Step 301). The teller then selects via the keyboard 7 the password change processing mode or option (Step 302). The password change processing screen's instructions (Step 303) are then shown in the teller's display unit 6, and the teller advises the customer of the instructions on the display. The customer can also follow the instructions if they are presented on the customer's display unit 3. If the customer has a card in which the password to be changed is written, he inserts the card into the card slot 21 (Step 304). He then inputs the present (old) password by means of the input panel 4 (Step 305). A comparison means (not shown) in the teller window central control unit 10 compares the password input by the input panel and the password written on the card (Step 306). If they match, the central control unit 10 makes an access to the customer data in the data center, on the basis of the data on the card (Step 307).

If the customer does not have the card with him because for instance he has lost it, he inserts the passbook of the corresponding account into the passbook slot 5 (FIG. 8, Step 422). The access is made based on the data on a magnetic stripe on the passbook to the password of the customer registered in the data center (FIG. 8, Step 423). The step 405 of inputting the password, the step 406 of comparing the password, and the step 407 of accessing the customer data in the data center are similar to those in the case where the customer has a card.

The customer data that have been sent from the data center are displayed on the teller's display unit 6 (Step 308). The teller then checks the identity of the customer by comparing some official certificate such as a driver's licence which the customer shows and the customer data which is displayed on the teller's display unit 6 (Step 309). Upon confirmation of the identity of the customer, the teller presses a confirmation key on the keyboard 7 (Step 310). When the confirmation key is pressed the customer data received from the data center are displayed also on the customer's display unit 6 (Step 311). The customer then confirms the data—name, address, etc on the customer's display unit 3, and following prompts on the display unit 3, he inputs his or her new desired password n times (Steps 312 & 314). As the customer inputs his or her password, each digit is indicated by a mark (Step 313 & 315). For example, when the first digit of the number is input, a single asterisk (*) appears, and when the second digit is input two asterisks (**) appear. The particular number given for each digit is shown neither on the customer's display unit 3 nor on the teller's display unit 6. After the password has been input n times, the n sets of passwords are compared by a logic circuit in the teller window central control unit 10 (Step 316), and if they do not all match the process returns to Step 312 for re-input of the password. If they all match, completion of the customer's input procedure is indicated on the teller's display unit 6 (Step 317) and the teller then presses the End key on the keyboard 7 (Step 318). This initiates transmission of the new password via the communications controllers 11 and 14 and the transmitter/receivers 12 and 13 to the data center's CPU 15, and this CPU 15 then changes the password on the file storage device 16 (Step 319). Next, the data center notifies the teller window transaction system that the password has been changed.

If the card has been inserted in the card slot 21 and is held at the card reader/writer 2, the card reader/writer 2 changes the password in the card (STEP 320), which is then ejected. The customer receives the card with the password changed (Step 321), and this completes the process for changing the password. After the password on the card has been changed, the memory in the teller window central control unit 10 used for storing the new password is cleared so that the password does not remain in the teller window transaction device.

If the customer has not brought the card, the process of the password change at the teller window is completed when the data center notifies that the password has been changed. Where a card or other such item must be issued, the relevant department at the data center subsequently uses an issuing device (not shown in the figures) that is connected to the CPU 15 to produce, without revealing the password to anyone, the card or other such item which bears this password, which is then sent to the customer (Step 424 in FIG. 8).

If the card reader/writer at the teller window is used for preparing a new card, the customer can then take away the card so that the inconvenience of waiting until a card is issued at the data center and sent to the customer can be avoided.

What is claimed is:

1. A system for registering a password, comprising:
    a data center to process and store customer identification data; and
    a teller window transaction device to communicate with the data center, the teller window transaction device including
        first input means used by a teller for entering customer identification data for a customer,
        first display means for displaying the entered customer identification data to the teller,
        second display means for displaying the entered customer identification data to the customer so that the customer can confirm that the customer identification data was accurately entered,
        second input means used by the customer for entering a password which has been selected by the customer and which is to be assigned to the customer identification data, the password being composed of a plurality of digits,
        means for preventing the first display means and the second display means from displaying the password,
        means for mounting the first input means so as to be operable from a first direction, for mounting the first display means so as to be visible from the first direction, for mounting the second input means so as to be operable from a second direction, and for mounting the second display means so as to be visible from the second direction, the first direction being opposite to the second direction so that the customer can be opposite to and communicate with the teller when the customer uses the second input means and the second display means; and
    means for transmitting the customer identification data and the password to the data center;
    wherein the data center stores the customer identification data and the password assigned to the customer identification data, whereby the password is stored at the data center without revealing the password.

2. A system according to claim 1, wherein the means for preventing additionally comprises means for displaying on the second display means characters representing the number of digits of the password that have been entered.

3. A system according to claim 1, wherein the second input means additionally comprises means for permitting the customer to enter a confirmation password composed of a plurality of digits, and wherein the teller window transaction device further comprises means for storing the first entered password, for comparing the first entered password with the confirmation password, for preventing the first and second display means from displaying the confirmation password, for displaying on the second display means characters representing the number of digits of the confirmation password that have been entered, and for enabling the transmission of the first entered password to the data center when the first entered password is identical to the confirmation password.

4. A system according to claim 1, wherein the second input means additionally comprises means for permitting the customer to enter a confirmation password composed of a plurality of digits, and further comprising means for temporarily storing the first entered password at the data center, for comparing the first entered password with the confirmation password, for preventing the first and second display means from displaying the confirmation password, for displaying on the second display means characters representing the number of digits of the confirmation password that have been entered, and for enabling the storage of the first entered password at the data center when the first entered password is identical to the confirmation password.

5. A system according to claim 1, wherein the second input means additionally comprises means for permitting the customer to enter a verification password after the first entered password and customer identification data have already been stored at the data center, and further comprising means for reading out the first entered password from the data center, for comparing the first entered password read out by the data center with the verification password entered by the customer using the second input means, for enabling the customer to use the second input means to enter a renewal password composed of a plurality of digits when the first entered password read out by the data center is identical to the verification password entered by the customer using the second input means, for preventing the first and second display means from displaying the renewal password, and for displaying on the second display means characters representing the number of digits of the renewal password that have been entered, whereby the renewal password can be stored in substitution for the first entered password in the data center without revealing the renewal password.

6. A system according to claim 1, wherein the customer identification data includes the customer's name and address.

7. A system according to claim 6, wherein the customer identification data further includes the customer's account number.

8. The system of claim 1, wherein the means for transmitting the customer identification data and the password to the data center comprises means for transmitting the customer identification data together with the password.

9. The system of claim 1, wherein the first input means comprises means for actuating the means for transmitting so as to initiate transmission of the password and the customer identification data from the teller window transaction device to the data center, the customer identification data and the password being transmitted together.

10. A system for registering a password, comprising:
first means for storing sets of customer identification passwords, each of the stored passwords corresponding to a respective set of stored customer identification data;
a card to store transaction data, the transaction data designating one of the stored passwords;
second means for receiving said card and for reading said transaction data;
third means, at a customer station, for permitting a customer to enter a password;
fourth means for comparing the entered password with a stored password;
fifth means for displaying the stored set of customer identification data corresponding to the stored password if the entered password is identical to the stored password that was compared by the fourth means, the fifth means additionally including means for preventing the entered password and the stored password compared by the fourth means from being displayed;
sixth means, at a teller station, for permitting a teller to enter customer confirmation data authorizing the customer to register a renewal password, the teller station being disposed opposite the customer station so that the teller and customer can talk face-to-face with one another,
said third means additionally including means for permitting the customer to enter the renewal password, the renewal password being composed of a plurality of digits;
seventh means for storing the renewal password in the first means in substitution for the stored password, whereby the renewal password is stored without revealing the previously stored password and the renewal password;
means for renewing the transaction data stored in the card in accordance with the renewal password; and
means for returning the card.

11. A system according to claim 10, wherein the fifth means further comprises means for displaying characters representing the number of digits of the renewal password that have been entered without displaying the renewal password.

12. A system according to claim 10, wherein the third means additionally comprises means for permitting the customer to enter a confirmation password composed of a plurality of digits, and wherein the seventh means comprises means for temporarily storing the renewal password, for comparing the temporarily stored renewal password with the confirmation password, and for enabling the temporarily stored renewal password to be stored in the first means if the temporarily stored renewal password is identical to the confirmation password.

13. The system of claim 12, wherein the fifth means further comprises means for preventing the confirmation password from being displayed, and for displaying characters representing the number of digits of the confirmation password that have been entered.

14. A system according to claim 10, wherein the customer identification data includes the customer's name and address.

15. A system according to claim 14, wherein the customer identification data further includes the customer's account number.

16. A system for registering a password, comprising:
means for storing sets of customer identification data and passwords, each of the passwords corresponding to a respective set of customer identification data;
a card to store transaction data, the transaction data designating one of the passwords; and
a teller window transaction device to communicate with the means for storing, the teller window transaction device including
means for receiving the card and for reading the transaction data,
first input means used by a customer for entering a verification password,
means for comparing the password designated by the transaction data with the verification password,
first display means used by a teller for receiving and displaying the set of customer identification data corresponding to the password designated by the transaction data so as to enable the teller to check the set of customer identification data and the identity of the customer if the password designated by the transaction data is identical to the verification password, the first display means including means for preventing the passwords from being displayed,
second input means used by the teller for entering customer confirmation data,
second display means used by the customer for displaying the set of customer identification data so as to enable the customer to confirm the set of customer identification data after the customer confirmation data has been entered, the second display means including means for preventing the passwords from being displayed,
means for mounting the first input means so as to be operable from a first direction, for mounting the first display means so as to be visible from the first direction, for mounting the second input means so as to be operable from a second direction, and for mounting the second display means so as to be visible from the second direction, the first direction being opposite to the second direction so that the customer can be opposite to and communicate with the teller when the customer uses the second input and display means,
the first input means additionally including means for permitting the customer to enter a renewal password, the renewal password being composed of a plurality of digits,
means for preventing the first and second display means from displaying the renewal password,
means for transmitting the renewal password to the means for storing,
means for revising the transaction data stored in the card in accordance with the renewal password, and
means for returning the card;
wherein the means for storing additionally includes means for storing the renewal password in substitution for the password designated by the transaction data stored on the card, whereby the renewal password is stored in the means for storing without revealing the stored and verification passwords and the renewal password.

17. A system according to claim 16, wherein the means for preventing further comprises means for displaying on the second display means characters representing the number of digits of the renewal password that have been entered.

18. A system according to claim 16, wherein the first input means additionally includes means for permitting the customer to enter a confirmation password composed of a plurality of digits, and wherein the teller window transaction device further comprises means for storing the renewal password, for comparing the renewal password with the confirmation password, for preventing the first and second display means from displaying the confirmation password, for displaying on the second display means characters representing the number of digits of the confirmation password that have been entered, and for enabling the transmission of the renewal password to the means for storing if the renewal password is identical to the confirmation password.

19. A system according to claim 16, wherein the first input means additionally includes means for permitting the customer to enter a confirmation renewal password composed of a plurality of digits, wherein the means for storing comprises a main file storage device and a temporary file storage device, and further comprising means for temporarily storing the renewal password in the temporary file storage device, for comparing the renewal password with the confirmation renewal password, for preventing the first and second display means from displaying the confirmation renewal password, for displaying on the second display means characters representing the number of digits of the confirmation password that have been entered, and for enabling the storage of the renewal password in the main file storage device if the password is identical to the confirmation password.

20. A system according to claim 16, wherein the customer identification data includes the customer's name and address.

21. A system according to claim 20, wherein the customer identification data further includes the customer's account number.

22. A system for registering a password, comprising:
first means for storing passwords and sets of customer identification data, each of the stored passwords corresponding to a respective set of stored customer identification data;
second means used by a customer for entering a verification password;
third means for comparing the verification password with a stored password, and for displaying the set of stored customer identification data corresponding to the respective stored password if the verification password is identical to the respective stored password, the third means including
means for reading a customer card which stores a password identical to a password stored in the first means,
means for comparing the password read from the customer card with the verification password,
means for accessing the first means to read out the set of customer identification data corresponding to the password stored in the first means that is identical to the password stored in the customer card if the password stored in the customer card is identical to the verification password, a customer display device to display the set of customer identification data read out of the first means to the customer, and a teller display device to display the set of customer identification data read out of the first means to the teller;

fourth means used by a teller for selectively entering customer confirmation data;

fifth means for permitting the customer to use the second means to enter a renewal password after the customer confirmation data has been entered;

sixth means for storing the renewal password in the first means in lieu of the stored password that was identical to the verification password; and seventh means for mounting the second means to be operable by the customer when the customer is disposed at a customer position, means for mounting the customer display device so that the customer display device is visible from the customer position, means for mounting the fourth means to be operable by the teller when the teller is disposed at a teller position, and means for mounting the teller display device so that the teller display device is visible from the teller position, wherein the teller and customer face one another when the teller is at the teller position and the customer is at the customer position.

23. A system in accordance with claim 22, wherein the renewal password has a plurality of digits, and further comprising means for signalling the customer each time a digit of the renewal password is entered without disclosing the digits that have been entered to the teller.

24. A system in accordance with claim 22, wherein the fifth means further comprises means for permitting the customer to use the second means to enter a confirmation renewal password, and means for determining whether the renewal password and the confirmation renewal password are identical.

25. A system according to claim 22, wherein the customer identification data includes the customer's name and address.

26. A system according to claim 25, wherein the customer identification data further includes the customer's account number.

27. A system for registering a password, comprising:
first means for storing passwords and sets of customer identification data, each of the stored passwords corresponding to a respective set of stored customer identification data;

second means used by a customer for entering a verification password;

third means for comparing the verification password with a stored password, and for displaying the set of stored customer identification data corresponding to the respective stored password if the verification password is identical to the respective stored password, the third means including means for reading a passbook which stores passbook information, means for accessing the first means with the passbook information to read out a stored password, means for comparing the password read out of the first means with the verification password, means for accessing the first means to read out the set of customer identification data corresponding to the password read out of the first means if the verification password is identical to the password read out of the first means, a customer display device to display the set of customer identification data read out of the first means to the customer, and a teller display device to display the set of customer identification data read out of the first means to the teller;

fourth means used by a teller for selectively entering customer confirmation data;

fifth means for permitting the customer to use the second means to enter a renewal password after the customer confirmation data has been entered;

sixth means for storing the renewal password in the first means in lieu of the stored password that was identical to the verification password; and seventh means for mounting the second means to be operable by the customer when the customer is disposed at a customer position, for mounting the customer display device so that the customer display device is visible from the customer position, for mounting the fourth means to be operable by the teller when the letter is disposed in a teller position, and for mounting the teller display device so that the teller display device is visible from the teller position, wherein the teller and customer face one another when the teller is at the teller position and the customer is at the customer position.

28. A system in accordance with claim 27, wherein the renewal password has a plurality of digits, and further comprising means for signalling the customer each time a digit of the renewal password is entered without disclosing the digits that have been entered to the teller.

29. A system in accordance with claim 27, wherein the fifth means further comprises means for permitting the customer to use the second means to enter a confirmation password, and means for determining whether the renewal password and the confirmation password are identical.

30. A method for registering a password, comprising the steps of:
(a) using a teller input device to enter customer identification data in electrical form, step (a) being conducted by a teller at a teller station;

(b) displaying the entered customer identification data on an electrical display device which is visible to a customer at a customer station so that the customer can confirm that the customer identification data was accurately entered by the teller, the customer station being disposed adjacent the teller station so that the teller and customer can talk face-to-face with one another;

(c) correcting the customer identification data if it was not accurately entered;

(d) using a customer input device to enter a password in electrical form, step (d) being conducted by the customer, and (e) storing the entered password and entered customer identification data in a data storage device.

31. A system according to claim 30, wherein the customer identification data includes the customer's name and address.

32. A system according to claim 31, wherein the customer identification data further includes the customer's account number.

33. The method of claim 30, wherein step (e) is not conducted until after both the customer identification data and the password have been entered.

34. A method for use by a teller and a customer to update a password that has been stored in an electrical storage device along with a set of customer identification data corresponding to the stored password, said method comprising the steps of:
(a) confirming that the customer knows the stored password;
(b) accessing the storage device to read out the customer identification data corresponding to the stored password;
(c) displaying on an electrical display device the customer identification data read out of the storage device, the electrical display device being visible to the teller at a teller station;
(d) using an input device at the teller station to enter customer confirmation data authorizing the customer to register a renewal password, step (d) being conducted by the teller;
(e) using an input device at a customer station to enter the renewal password in electrical form, step (e) being conducted by the customer, the customer station being disposed adjacent the teller station so that the teller and customer can talk face-to-face with one another; and
(f) storing the renewal password in the storage device in substitution for the password that was originally stored.

35. A system according to claim 34, wherein the customer identification data includes the customer's name and address.

36. A system according to claim 35, wherein the customer identification data further includes the customer's account number.

* * * * *